United States Patent Office 3,787,487
Patented Jan. 22, 1974

3,787,487
PREPARATION OF METAL SALT SLURRIES FROM METAL SALT SOLUTIONS
Fred T. Sherk, Bartlesville, Okla., assignor to Philips Petroleum Company
No Drawing. Filed June 25, 1971, Ser. No. 157,748
Int. Cl. C07c 63/14, 63/26
U.S. Cl. 260—515 P
8 Claims

ABSTRACT OF THE DISCLOSURE

A water solution of a metal salt of a carboxylic acid is contacted with a liquid dispersant to form a mixture; the mixture is then heated to drive the water substantially therefrom to thereby form a slurry of the solid metal salt in the dispersant.

This invention relates to the production of aromatic polycarboxylates by disproportionation of alkali metal salts of aromatic carboxylic acids. It further relates to the production of aromatic carboxylic acids from aromatic polycarboxylates. It still further relates to the recovery and reuse of alkali metal salts of aromatic carboxylic acids produced during the formation of aromatic carboxylic acids from aromatic polycarboxylates.

BACKGROUND OF THE INVENTION

It is well known in the art that alkali metal salts of carboxylic acids having carboxyl groups which are attached to aromatic ring systems can be converted, i. e., transformed, into salts of different carboxylic acids having at least two carboxyl groups in the molecule by heating the said alkali metal salts to elevated temperatures in the presence of a protective gas. In this regard see U.S. Pat. 2,823,230 which describes, for example, the production of dipotassium terephthalate by conversion of potassium benzoate using zinc benzoate to catalyze the reaction. It is also known that this transformation is a solid state reaction, that is, the alkali metal salt and the catalyst are heated in the solid state to effect the transformation, called disproportionation, with the resulting product, being comprised, for example, of dipotassium terephthalate, also being in the solid state.

It is still further known in the art that the disproportionation reaction product, for example, dipotassium terephthalate, can be converted to the corresponding carboxylic acid, for example, terephthalic acid, by reacting the disproportionation reaction product with an aromatic carboxylic acid, for example, benzoic acid. This reaction is known in the art as a metathesis reaction. See, for example, U.S. Pat. 2,930,813.

During the metathesis reaction there is produced, in addition to the desired acid product, the alkali metal salt of the aromatic carboxylic acid which was originally subjected to the disproportionation reaction to produce the disproportionation reaction product. For example, potassium benzoate can be converted to dipotassium terephthalate in a disproportionation reaction; the dipotassium terephthalate is converted to terephthalic acid by reaction with benzoic acid in the metathesis reaction during which reaction there is also produced potassium benzoate from which additional dipotassium terephthalate can be produced in a disproportionation reaction. Accordingly, it is quite important to recover the alkali metal salt of the carboxylic acid produced during the metathesis reaction for purposes of recycle and reuse in the disproportionation reaction. However, the disproportionation reaction-metathesis reaction process has met with considerable difficulties in the art with respect to its being used in commercial operations. Among these difficulties is included the problem of recovering, transporting, and reusing the alkali metal salt of the aromatic carboxylic acid which is, in effect, regenerated during the metathesis reaction.

In one process known in the art the metathesis reaction product is water washed and filtered to recover a solid filter cake with the resulting filtrate solution being then evaporated to dryness to recover the alkali metal salts for recycle as a solid to the disproportionation reactor. See, for example, U.S. Pat. 2,905,709. This technique, however, does not solve the major problem of recovering and transporting the alkali metal salt in a convenient handling technique as it is difficult and expensive to handle solids.

THE INVENTION

It is thus an object of this invention to provide an improved process for the disproportionation of carboxylic acid salts.

Another object of this invention is to provide a process wherein the disproportionation of carboxylic acid salts is conducted in a fluid medium.

It is yet another object of this invention to provide a process wherein the alkali metal salt utilized in the disproportionation process is introduced into the disproportionation reactor, recovered from the reactor and regenerated, and then recycled to the disproportionation reactor while being maintained as a dispersed solid in a fluid medium.

Other aspects, objects, and the several advantages of this invention will be apparent to one skilled in the art from the following specification and appended claims.

In accordance with this invention, I have discovered that a slurry of a solid metal salt of an aromatic carboxylic acid in a liquid dispersant can be produced directly from a solution of the same metal salt dissolved in water. More precisely, in accordance with this invention there is provided a process whereby a water solution of a metal salt dissolved in water is contacted with a liquid dispersant in a mixing zone wherein the solution and dispersant are uniformly mixed to form a mixture of the solution and the dispersant. The mixture is treated in an evaporation zone wherein heat is applied to the mixture in sufficient quantity to substantially vaporize the water from the mixture to thereby form a slurry comprised of the solid metal salt of the carboxylic acid in the liquid dispersant. The thus-formed slurry is thereafter removed from the evaporation zone for other uses.

The thus-produced slurry containing the solid metal salt of the aromatic carboxylic acid in the dispersant is highly useful in the production of aromatic polycarboxylates by disproportionation of alkali metal salts of aromatic carboxylic acids wherein the metal salt is an alkali metal salt. In this use the solid alkali metal salt is the feed material which is converted in the disproportionation reaction itself and the disproportionation reaction is conducted in a slurry system. Thus, the dispersant is not only the medium in which the dissolved alkali metal salt is converted to the solid state and transported therein to the disproportionation reaction but it is also the dispersant for the disproportionation reaction itself. Accordingly, the entire cycle, including the disproportionation reaction, the preliminary recovery of the aromatic polycarboxylate from the disproportionation reaction product (wherein the aromatic polycarboxylate is in a water phase and the spent disproportionation reaction catalyst is in an organic phase), the metathesis reaction, and the conversion of the alkali metal salt-containing solution to the above-described slurry is conducted entirely in a fluid medium. At no time are any of the materials required to be handled solely as solids even though, for example, the alkali metal salt passes from the dissolved to the solid state.

There is thus provided an improved disproportionation process for the conversion of an alkali metal salt of an aromatic carboxylic acid to an aromatic polycarboxylate containing at least one additional carboxyl group wherein a slurry comprised of an alkali metal salt of an aromatic carboxylic acid, a disproportionation catalyst and an inert high-boiling organic dispersant is subjected to heating at an elevated temperature in the presence of a gas atmosphere to thus form the desired polycarboxylate product. The effluent from the disproportionation reaction is a slurry comprised of the desired aromatic polycarboxylate, the spent disproportionation catalyst and the dispersant. The disproportionation reactor slurry is then introduced into a separation zone wherein it is contacted with water to produce two liquid phases, one of which being comprised of the spent disproportionation catalyst in the dispersant and the other being a solution of the desired aromatic polycarboxylate in water. The two liquid phases are easily separated, for example, by decantation. It is the water solution of the desired aromatic polycarboxylate which is introduced into the metathesis reactor which was mentioned previously for production of the aromatic carboxylic acid with consequent regeneration of the alkali metal salt of the aromatic carboxylic acid.

The solution of the metal salt in water which is converted to a slurry of the solid metal salt in a liquid dispersant is preferably a substantially saturated solution and, still more preferably, crystals of metal salt are also in the saturated solution. The saturated solution can be conveniently formed by subjecting the less dilute solution of the metal salt dissolved in water to a sufficient quantity of heat to concentrate the solution to thus form the substantially saturated solution and, as previously mentioned, still more preferably, one having actual crystals of salt dispersed throughout the saturated solution.

The saturated solution at a temperature substantially equal to its boiling point is thereafter contacted with the dispersant in the mixing zone. In the mixing zone the dispersant and solution are thoroughly mixed together to thereby form an emulsion or dispersion of the saturated solution in the dispersant. It is preferred that the dispersant, when it is introduced into the mixing zone containing the hot saturated solution, be at approximately the same temperature as the saturated solution. However, the dispersant can be at a temperature lower or higher than the temperature of the saturated solution which, as previously mentioned, is substantially at its boiling point.

The dispersion is preferably introduced into an evaporation zone wherein sufficient heat is applied to the dispersion to vaporize all or substantially all of the water from the dispersion. This water removal step is conveniently conducted at a temperature in the range of 300 to 500° F. and at a pressure in the range of 80 to 800 p.s.i.a. It is thus seen that as the water is vaporized from the solution dispersant mixture the metal salt passes from the dissolved state to the solid state; however, because the solution was thoroughly mixed with the dispersant the formed solid metal salt is carried by the dispersant such that when the water is completely driven off there remains a slurry of said solid metal salt in the dispersant. The slurry produced in the evaporation zone can be introduced directly into the disproportionation reactor. However, any water remaining in the slurry can be removed in still a second evaporation zone where, in addition to additional heating, carbon dioxide is bubbled through the slurry to aid in removal of any excess water. From this second evaporation zone the resulting slurry of the metal salt of the carboxylic acid is removed in a substantially water-free condition.

The dispersant useful herein is one which will not decompose under the conditions of the process, which is inert to the reactants, and which is relatively high boiling. Such dispersants include aromatic hydrocarbons selected from the group consisting of polyaromatic compounds having two or more aromatic rings, polynuclear aromatics and mixtures thereof. Examples of such organic dispersants include biphenyls, terphenyls, quaterphenyls, pentaphenyls and heavier polyphenyls; binaphthyls, naphthalene, anthracene, phenanthrene, pyrene, triphenylene, chrysene, perylene, pentacenyl and mixtures thereof. It is desirable that the organic dispersant remain in the liquid state throughout the process; thus the compound should have a melting point below about 150° C. Mixtures of two or more of the compounds can be utilized to reduce the melting point of the dispersant. It is also desirable that the dispersant have a relatively high boiling point, for example above 250° C., in order to aid in maintaining the pressure at a low level.

The quantity of dispersant required to form the desired metal salt-dispersant slurry is expressed in terms of the weight ratio of dispersant to metal salt in the dispersion formed in the mixing zone. Thus, the ratio of the dispersant to the metal salt in the dispersion is in the range of 0.3 to 5.0 parts by weight dispersant per part by weight of metal salt and preferably in an amount in the range of from 0.8 to 2.0 parts by weight dispersant per part by weight of metal salt.

Where the process for producing a slurry of a solid metal salt of a carboxylic acid is utilized in a disproportionation process, the preferred metal salt is an alkali metal salt and the preferred carboxylic acid is an aromatic carboxylic acid wherein the preferred alkali metal salt of an aromatic carboxylic acid is potassium benzoate. Accordingly, the preferred alkali metal is potassium and the preferred aromatic carboxylic acid is benzoic acid. Utilizing potassium benzoate in a disproportionation process, the desired disproportionation product would therefore be dipotassium terephthalate. The preferred dispersant for use in the entire process is terphenyl.

In a broader aspect of this invention, in addition to the presently preferred alkali metal salts of benzoic acid, the salts of other aromatic mono- or polycarboxylic acids can be used. Such acids are those of the formula

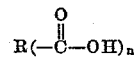

wherein R is an aromatic or alkyl aromatic group having 6 to 15 carbon atoms therein, and $n$ is the integer 1, 2 or 3. Such acids include, for example, benzoic acid, 2-naphthalenecarboxylic acid, 4-biphenylcarboxylic acid, 2,6-naphthalenedicarboxylic acid, phthalic acid, isophthalic acid, terephthalic acid, 2-anthracenecarboxylic acid, 1,5-anthracenedicarboxylic acid, 1,5,9-anthracenetricarboxylic acid, 3-phenanthrenecarboxylic acid, 2,3,4-trimethylbenzenecarboxylic acid, 2,4,6-trimethylbenzene-1,3-dicarboxylic acid, 2-ethyl-4-hexyl-6-methylbenzene-1,3-dicarboxylic acid, 2,4 - dibutylbenzene-1,3,5-tricarboxylic acid, and the like.

In all of the above-mentioned carboxylic acids the aromatic ring may carry alkyl radicals in addition to the carboxyl groups provided that these alkyl radical substituents do not bring about a decomposition of the molecule at temperatures equal to or lower than the reaction temperature.

After the slurry of the alkali metal salt of an aromatic carboxylic acid is recovered, the slurry thus produced can be introduced into a disproportionation zone and subjected to the well-known disproportionation process. Thus the slurry comprised of the alkali metal salt of an aromatic carboxylic acid and, if desired, a suitable disproportionation catalyst is subjected to heating in a gas atmosphere in order to effect the conversion of the alkali metal salt to the desired aromatic polycarboxylate.

The disproportionation reaction can be carried out with or without transformation catalysts; however, the reaction is favorably influenced by the presence of catalysts. Metals such as zinc, cadmium, mercury, lead, and iron, as well as the salts of the above metals formed with those aromatic carboxylic acids which may serve as starting materials for the reaction or which are formed by this reaction, for example, their benzoates, phthalates or terephthalates, may be used as catalysts.

As is known in the disproportionation reaction, the amount of catalyst used can vary within wide limits and can range from 0.1 to 100 grams of catalyst per mol of aromatic carboxylate employed, more preferably in the range of 1 to 50 grams per mol.

The conversion of the alkali metal carboxylate is effected substantially completely in the absence of oxygen or water. In general, temperatures in the range of about 350 to 500° C. are employed, and more preferably in the range of 400 to 480° C.

The process can be carried out in a gas atmosphere. Examples of such gases include nitrogen, methane, argon, neon, butane, ethane, helium and the like. In one embodiment of the invention there is utilized an atmosphere which contains additionally at least 50 mol percent carbon dioxide. However, the presence of carbon dioxide in the atmosphere in which the thermal conversion is carried out is not essential to the obtaining of the high conversion of initial reactant. In addition, carbon monoxide or a mixture of CO and $CO_2$ can be used in carrying out the process of the invention.

Pressures in the range of 0 p.s.i.g. to 5000 p.s.i.g. or more can be employed, but it is advantageous and preferable, in keeping with one embodiment of the instant invention, that lower pressures in the range of 0 to 1000 p.s.i.g. be employed.

Sufficient reaction time should be employed to effect the desired degree of conversion. Generally, reaction times in the range of about 1 second to about 48 hours, and preferably 5 seconds to two hours, are suitable.

In addition, the disproportionation reaction can be promoted by addition of alkali metal salts, preferably potassium salts of derivatives of cyanic acid or its polymers, to the reaction mixture. Suitable polymers or derivatives of cyanic acid are, for example, cyanuric acid, cyanamide and dicyandiamide. The derivatives of cyanic acid are preferably employed in the form of their potassium salts, provided they form salts with alkali metals. In many cases the use of potassium cyanate offers special advantages.

The aromatic polycarboxylates which are produced in the disproportionation reaction can be recovered from the reaction effluent slurry by adding water to the slurry followed by agitation and settling. The water, being substantially completely immiscible with the organic dispersant, separates as a separate liquid phase carrying with it in solution the water-soluble aromatic polycarboxylates. The organic dispersant phase which contains the spent catalyst particles is easily removed from the water phase by conventional phase separation techniques, such as by decantation. The liquid phase is then introduced into a metathesis reactor wherein the aromatic polycarboxylate is contacted with an aromatic carboxylic acid during which reaction the alkali metal salt of the aromatic carboxylic acid is produced.

The following example will enable persons skilled in the art to better understand and practice the invention. However, the example is not intended to limit the scope of this invention.

EXAMPLE

To a thermal disproportionation reactor is passed 175 pounds per hour of terphenyl, 52 pounds per hour of carbon dioxide, 160 pounds per hour of potassium benzoate, and 8 pounds per hour of zinc benzoate. The reactor is operated at 825° F., 800 p.s.i.g., and has a residence time of one hour. The reactor effluent consists of a slurry containing 175 pounds per hour of terphenyl, 106 pounds per hour of dipotassium terephthalate dispersed as solid particles in the terphenyl, 2.6 pounds per hour of zinc carbonate and oxide, also dispersed as a solid in the terphenyl, 13.4 pounds per hour of potassium carbonate, and 46 and 52 pounds per hour, respectively, of benzene and carbon dioxide; the latter two components are continuously vented from the reactor in the gaseous state.

The slurry from the disproportionation reactor is mixed with 360 pounds per hour of water and passed into a phase separation tank operated at about 375° F. and a pressure of 250 p.s.i.g. The mixture separates in the tank into a water phase and a terphenyl phase. The aqueous phase consists of 13.4 pounds per hour of dissolved potassium carbonate and 106 pounds per hour of dissolved dipotassium terephthalate in the 360 pounds of water. Any solid particles of zinc oxide in the water phase are recovered by filtration. The terphenyl phase containing the 175 pounds per hour of terphenyl and 2.6 pounds per hour of solid, dispersed zinc oxide particles (including that recovered from the water phase by filtration) is passed to a catalyst regeneration step.

The water phase from the separation tank consisting of 360 lb./hr. of water, 13.4 lb./hr. of potassium carbonate, and 106 lb./hr. of dipotassium terephthalate is passed to a metathesis reactor to which is added 122 lb./hr. of molten benzoic acid. The metathesis reactor consists of three or more conventional stirred tanks operated in series at 275° F., a residence time of 0.5 hour, and at atmospheric pressure. The benzoic acid reacts with the dipotassium terephthalate in the metathesis reactor to produce terephthalic acid which crystallizes out of solution as crystals and potassium benzoate which remains in solution. Effluent from the metathesis reactor consists of 72.6 lb./hr. of terephthalic acid crystals and 160 lb./hr. potassium benzoate dissolved in 360 lb./hr. of water. About 4.3 lb./hr. of carbon dioxide is also vented from the metathesis reactor. Effluent from the metathesis reactor is passed to a simple settler wherein the acid crystals settle to the bottom and are withdrawn as a concentrated slurry—(a centrifuge or filter can be used in place of the settler). The concentrated slurry of acid crystals is washed on a filter or in a centrifuge with water at 200° F. followed by reslurrying and rewashing of the acid crystals with water at 400° F.—essentially all potassium benzoate is thus washed from the terephthalic acid crystals.

The aqueous phase containing dissolved potassium benzoate obtained from the settler is passed to a first evaporator wherein most of the water is boiled off. About 160 lb./hr. of terphenyl at 400° F. is now added to the concentrated aqueous solution of potassium benzoate and the resulting mixture passed to a second evaporator wherein it is additionally heated to drive off essentially all of the remaining water to leave a slurry containing 160 lb./hr. of terphenyl and 160 lb./hr. of solid potassium benzoate particles.

The potassium benzoate is thus recovered from solution and recycled in the solid state to the disproportionation reactor without being handled in the dry solid state.

Reasonable variations and modifications are possible within the scope of the foregoing disclosure without departing from the spirit and scope thereof.

That which is claimed is:

1. In a disproportionation process for the conversion of an alkali metal salt of an aromatic carboxylic acid to an aromatic polycarboxylate containing at least one additional carboxyl group wherein a slurry comprised of an alkali metal salt of an aromatic carboxylic acid, a disproportionation catalyst and an inert high-boiling dispersant selected from the group consisting of binaphthyl, terphenyl and quaterphenyl, and mixtures thereof, is subjected to heating in a disproportionation zone at an elevated temperature so as to form said aromatic polycarboxylate, wherein a reaction mixture comprising said aromatic polycarboxylate, spent disproportionation catalyst and dispersant is thereafter contacted with water whereby there is formed a first liquid phase comprised of said dispersant and a second liquid phase comprised of said polycarboxylate and water, wherein said first and second liquid phases are separated and wherein said second phase is contacted with an aromatic carboxylic acid so as to convert said aromatic polycarboxylate to the corresponding aromatic polycarboxylic acid thereby forming a solution of alkali metal salt of said aromatic carboxylic acid in water, the improvement which comprises contacting said solution of said alkali metal salt of said aromatic carboxylic acid in water with said inert high-boiling dispersant in a mixing zone, heating the resulting mixture of alkali metal salt of aromatic carboxylic acid, water and dispersant so as to effect the removal of water therefrom and thereafter recovering as a slurry said alkali metal salt of said aromatic carboxylic acid and dispersant.

2. The process of claim 1 wherein said solution is sufficiently heated to form a substantially saturated solution of said metal salt in said water and said saturated solution, substantially at its boiling point, is thereafter contacted with said disperant in said miling zone.

3. The process of claim 2 wherein said dispersant in said mixing zone is substantially at the same temperature as said saturated solution.

4. The process of claim 3 wherein the weight ratio of said dispersant to said metal salt in said dispersion is in the range of 0.3 to 5.0 parts by weight dispersant per part by weight of said metal salt.

5. The process of claim 1 wherein said metal salt is an alkali metal salt of an aromatic carboxylic acid represented by the general formula

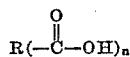

wherein R is selected from aromatic and alkyl aromatic groups having 6 to 15 carbon atoms and $n$ is an integer 1, 2 or 3.

6. The process of claim 1 wherein said slurry is introduced into a disproportionation zone wherein said alkali metal salt of said aromatic carboxylic acid is transformed into said alkali metal salt of said second aromatic carboxylic acid.

7. The process of claim 1 wherein said dispersant is terphenyl.

8. The process of claim 7 wherein said alkali metal salt of said aromatic carboxylic acid is potassium benzoate, said aromatic carboxylic acid is benzoic acid, and said alkali metal salt of said second aromatic carboxylic acid is dipotassium terephthalate.

References Cited

UNITED STATES PATENTS

| | | | |
|---|---|---|---|
| 3,173,948 | 3/1965 | Probst et al. | 260—526 |
| 3,042,717 | 7/1962 | Schenk | 260—515 |
| 2,904,587 | 9/1959 | Johnson et al. | 260—515 |
| 2,913,488 | 11/1959 | Blaser et al. | 260—515 |
| 2,912,437 | 11/1959 | Schutt et al. | 260—515 |
| 3,096,366 | 7/1963 | Smith et al. | 260—515 |

OTHER REFERENCES

Weissberger: Physical Methods of Organic Chemistry, vol. 1 (pt. 1) (1959), p. 347, Interscience, New York.

JAMES A. PATTEN, Primary Examiner

UNITED STATES PATENT OFFICE
CERTIFICATE OF CORRECTION

Patent No. 3,787,487          Dated January 22, 1974

Inventor(s) Fred T. Sherk

It is certified that error appears in the above-identified patent and that said Letters Patent are hereby corrected as shown below:

Column 7, line 11, "miling zone" should read -- mixing zone --.

Signed and sealed this 3rd day of September 1974.

(SEAL)
Attest:

McCOY M. GIBSON, JR.　　　　　　　　　C. MARSHALL DANN
Attesting Officer　　　　　　　　　　　Commissioner of Patents